Nov. 25, 1930.  F. BRANDON  1,783,107
HANDLE
Filed April 9, 1929
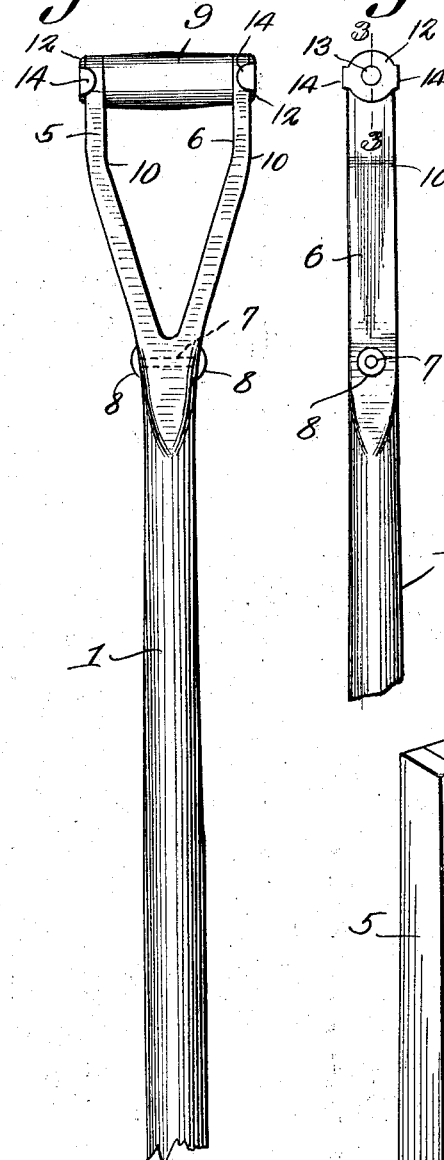
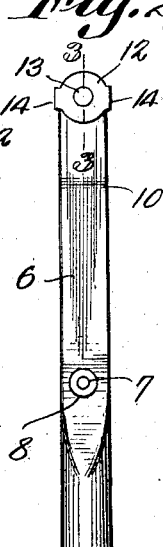
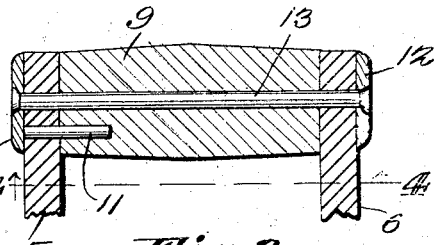
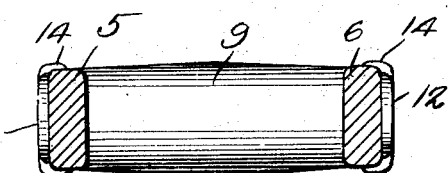
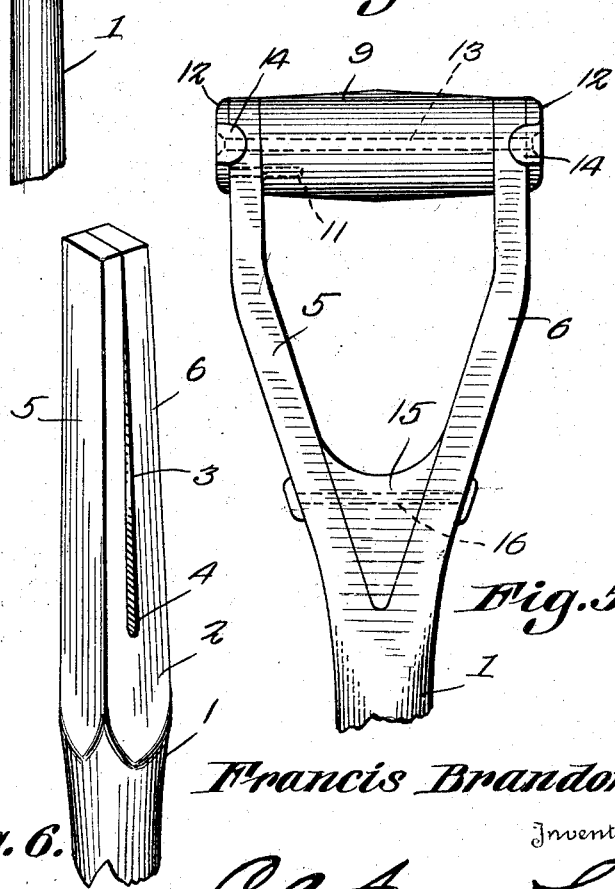
Francis Brandon
Inventor Patented Nov. 25, 1930

1,783,107

UNITED STATES PATENT OFFICE

FRANCIS BRANDON, OF NEW ALBANY, INDIANA

HANDLE

Application filed April 9, 1929. Serial No. 353,739.

This invention relates to handles for use with shovels and other hand implements, one of the objects being to simplify the construction of the handle and at the same time produce a handle that is more durable than those heretofore used.

Another object is to provide a handle utilizing a grip so mounted that it cannot rotate relative to the fork in which it is seated.

A further object is to provide a means for preventing the members of the fork from splitting or checking.

A still further object is to provide a handle the members of the fork of which have the grain of the wood extending longitudinally thereof, said members being free of extended curved portions that tend to weaken a structure of this kind.

A still further object is to provide a handle utilizing the maximum amount of material in the formation thereof without increasing the cost of production.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred forms of the invention have been shown.

In said drawings,

Figure 1 is an elevation of a handle and a portion of its shank.

Figure 2 is a side elevation thereof.

Figure 3 is an enlarged section on line 3—3, Figure 2.

Figure 4 is a section on line 4—4, Figure 3.

Figure 5 is a front elevation of a modified form of handle.

Figure 6 is a perspective view of a portion of a blank from which the handle is formed.

Referring to the figures by characters of reference, 1 designates a rounded shank that is turned from an elongated angular billet of wood. One end of this billet or blank, which is illustrated in Figure 6, is left angular and is tapered as shown at 2, the said tapered end being split longitudinally. The inner end of the slot 3 is rounded as shown at 4 and the walls of the slot are preferably made parallel with the opposed walls of the tapered portion 2. Thus two arms 5 and 6 are formed each of which is rectangular in cross section and contains much more material than would be the case should said arms be produced from a billet after it had been rounded throughout its length.

For the purpose of preventing the blank from splitting when the arms 5 and 6 are spread apart as hereinafter explained, a rivet 7 is extended transversely therethrough near the end 4 of the slot 3, the ends of this rivet being upset and engaging washers 8 that bear against opposed faces of the blank.

The arms 5 and 6 are adapted to be spread in any well-known manner so as to diverge from the rounded end 4 of the slot 3 along straight lines until they reach points that are spaced apart a distance equal to the length of the grip 9 forming a part of the handle. From these points 10 the arms 5 and 6 are extended along parallel lines so as to fit snugly against the squared ends of the grip 9. A dowel 11 is inserted through either or both of the arms 5 and 6 into the adjacent end of the grip 9 and this dowel is held against withdrawal by a washer 12 bearing against the outer side of the arm. Two of the washers are used, one on the outer side of each arm, and said washers are connected by a tie pin 13 extending longitudinally through the grip and also extending through the arms 5 and 6 and the washers 12. The ends of the pin are upset.

Each of the washers 12 has diametrically opposed ears 14 extended at right angles therefrom and adapted to engage opposed faces of the arm on which the washer is mounted. Said washer with its ears thus constitutes a means for preventing the arm from splitting or checking.

Importance is attached to the fact that each of the arms 5 and 6 is rectangular in cross section and is of a width equal to or greater than the maximum diameter of the shank 1. The arms are extended along straight lines from their ends to points 10 and the grain of the wood follows these arms. Thus greater strength is obtained than where the arms intersect or extend obliquely of the grain. Each arm has only one bend, this being indicated at the points 10. Consequently breakage during the formation of the handle is reduced to the minimum.

If desired, and as shown in Figure 5, a tapered filler in the form of a block 15 can be inserted into the crotch formed by the diverging arms 5 and 6 and the rivet 16 can be extended through this block and through the arms 5 and 6 instead of being extended through the shank at a point beyond the arms.

What is claimed is:

A handle including a one-piece shank having diverging integral arms joined by a rounded crotch and each having its opposed faces parallel, said arms being extended from the rounded crotch along straight lines to points adjacent their free ends, the free end portions of the arms being extended along parallel lines, a grip having squared ends interposed between the parallel portions of the arms, means embracing the arms for preventing them from splitting, a dowel extending through one of the arms and into the grip for holding the grip against rotation, said dowel being retained by one of the means embracing said arm, and a tie device extending through the grip and arm and the arm embracing means and constituting the sole means for holding them against relative movement.

In testimony that I claim the foregoing as my own, I have hereto affixed my signature.

FRANCIS BRANDON.